US012328251B2

(12) United States Patent
Almog et al.

(10) Patent No.: US 12,328,251 B2
(45) Date of Patent: Jun. 10, 2025

(54) MARKING OF RDMA-OVER-CONVERGED-ETHERNET (ROCE) TRAFFIC ELIGIBLE FOR ADAPTIVE ROUTING

(71) Applicant: MELLANOX TECHNOLOGIES, LTD., Yokneam (IL)

(72) Inventors: Ariel Almog, Kochav Yair (IL); Eitan Zahavi, Zichron Yaakov (IL); Idan Burstein, Akko (IL); Zachy Haramaty, Ramat Gan (IL); Aviv Barnea, Beerotaim (IL)

(73) Assignee: Mellano Technologies, Ltd., Yokneam (IL)

( * ) Notice: Subject to any disclaimer, the term of this patent is extended or adjusted under 35 U.S.C. 154(b) by 319 days.

(21) Appl. No.: 17/990,686

(22) Filed: Nov. 20, 2022

(65) Prior Publication Data
US 2024/0089194 A1    Mar. 14, 2024

Related U.S. Application Data

(60) Provisional application No. 63/404,551, filed on Sep. 8, 2022.

(51) Int. Cl.
*H04L 45/00* (2022.01)
*H04L 67/1097* (2022.01)
*H04L 69/22* (2022.01)

(52) U.S. Cl.
CPC .............. *H04L 45/22* (2013.01); *H04L 45/66* (2013.01); *H04L 67/1097* (2013.01); *H04L 69/22* (2013.01)

(58) Field of Classification Search
CPC ..... H04L 45/22; H04L 45/66; H04L 67/1097; H04L 69/22
See application file for complete search history.

(56) References Cited

U.S. PATENT DOCUMENTS

| 4,312,064 | A  | 1/1982  | Bench et al.   |
|-----------|----|---------|----------------|
| 6,115,385 | A  | 9/2000  | Vig            |
| 6,169,741 | B1 | 1/2001  | Lemaire et al. |
| 6,480,500 | B1 | 11/2002 | Erimli et al.  |

(Continued)

FOREIGN PATENT DOCUMENTS

| CN | 1394053 A   | 1/2003  |
| CN | 105141512 A | 12/2015 |

(Continued)

OTHER PUBLICATIONS

U.S. Appl. No. 17/902,920 Office Action dated Feb. 14, 2024.

(Continued)

*Primary Examiner* — Shean Tokuta
(74) *Attorney, Agent, or Firm* — Meitar Patents Ltd.; Daniel Kligler

(57) ABSTRACT

A network adapter includes a port and one or more circuits. The port is to send packets to a network in accordance with a Remote Direct Memory Access over Converged Ethernet (RoCE) protocol. The one or more circuits are to decide whether a packet is permitted to undergo Adaptive Routing (AR) in being routed through the network, to mark the packet with an indication of whether the packet is permitted to undergo AR, and to send the marked packet to the network via the port.

14 Claims, 2 Drawing Sheets

(56) References Cited

U.S. PATENT DOCUMENTS

| | | |
|---|---|---|
| 6,532,211 B1 | 3/2003 | Rathonyi et al. |
| 6,553,028 B1 | 4/2003 | Tang et al. |
| 6,614,758 B2 | 9/2003 | Wong |
| 6,665,297 B1 | 12/2003 | Harigochi et al. |
| 6,775,268 B1 | 8/2004 | Wang et al. |
| 6,795,886 B1 | 9/2004 | Nguyen |
| 6,804,532 B1 | 10/2004 | Moon et al. |
| 6,807,175 B1 | 10/2004 | Jennings |
| 6,831,918 B1 | 12/2004 | Kavak |
| 6,912,589 B1 | 6/2005 | Jain et al. |
| 6,912,604 B1 | 6/2005 | Tzeng et al. |
| 6,950,428 B1 | 9/2005 | Horst et al. |
| 7,010,607 B1 | 3/2006 | Bunton |
| 7,076,569 B1 | 7/2006 | Bailey et al. |
| 7,221,676 B2 | 5/2007 | Green et al. |
| 7,234,001 B2 | 6/2007 | Simpson et al. |
| 7,274,869 B1 | 9/2007 | Pan et al. |
| 7,286,535 B2 | 10/2007 | Ishikawa et al. |
| 7,401,157 B2 | 7/2008 | Costantino et al. |
| 7,590,110 B2 | 9/2009 | Beshai et al. |
| 7,676,597 B2 | 3/2010 | Kagan et al. |
| 7,746,854 B2 | 6/2010 | Ambe et al. |
| 7,899,930 B1 | 3/2011 | Turner et al. |
| 7,924,837 B1 | 4/2011 | Shabtay et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,570,865 B2 | 10/2013 | Goldenberg et al. |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,625,427 B1 | 1/2014 | Terry et al. |
| 8,681,641 B1 | 3/2014 | Sajassi et al. |
| 8,737,269 B1 | 5/2014 | Zhou et al. |
| 8,755,389 B1 | 6/2014 | Poutievski et al. |
| 8,774,063 B2 | 7/2014 | Beecroft |
| 8,867,356 B2 | 10/2014 | Bloch et al. |
| 8,873,567 B1 | 10/2014 | Mandal et al. |
| 8,908,510 B2 | 12/2014 | Sela et al. |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,137,143 B2 | 9/2015 | Parker et al. |
| 9,231,888 B2 | 1/2016 | Bogdanski et al. |
| 9,264,382 B2 | 2/2016 | Bogdanski et al. |
| 9,385,949 B2 | 7/2016 | Vershkov et al. |
| 9,544,185 B1 | 1/2017 | Yadav et al. |
| 9,548,960 B2 | 1/2017 | Haramaty et al. |
| 9,571,400 B1 | 2/2017 | Mandal et al. |
| 9,584,429 B2 | 2/2017 | Haramaty et al. |
| 9,699,095 B2 | 7/2017 | Elias et al. |
| 9,729,473 B2 | 8/2017 | Haramaty et al. |
| 9,876,727 B2 | 1/2018 | Gaist et al. |
| 9,985,910 B2 | 5/2018 | Gafni et al. |
| 10,009,277 B2 | 6/2018 | Goldenberg et al. |
| 10,079,782 B2 | 9/2018 | Haramaty et al. |
| 10,200,294 B2 | 2/2019 | Shpiner et al. |
| 10,205,683 B2 | 2/2019 | Elias et al. |
| 10,218,642 B2 | 2/2019 | Mula et al. |
| 10,230,652 B2 | 3/2019 | Haramaty et al. |
| 10,389,646 B2 | 8/2019 | Zdorov et al. |
| 10,554,556 B2 | 2/2020 | Haramaty et al. |
| 10,574,546 B2 | 2/2020 | Levi et al. |
| 10,644,995 B2 | 5/2020 | Levy et al. |
| 11,005,724 B1 | 5/2021 | Shpigelman et al. |
| 11,310,163 B1 | 4/2022 | Lo et al. |
| 11,336,287 B1* | 5/2022 | Rodriguez .......... G06F 15/7825 |
| 11,411,911 B2 | 8/2022 | Levi et al. |
| 11,520,717 B1* | 12/2022 | Clarke .................... G06F 13/28 |
| 2001/0043564 A1 | 11/2001 | Bloch et al. |
| 2001/0043614 A1 | 11/2001 | Mswanadhham et al. |
| 2002/0009073 A1 | 1/2002 | Furukawa et al. |
| 2002/0013844 A1 | 1/2002 | Garrett et al. |
| 2002/0026525 A1 | 2/2002 | Armitage |
| 2002/0039357 A1 | 4/2002 | Lipasti et al. |
| 2002/0067693 A1 | 6/2002 | Kodialam et al. |
| 2002/0071439 A1 | 6/2002 | Reeves et al. |
| 2002/0085586 A1 | 7/2002 | Tzeng |
| 2002/0136163 A1 | 9/2002 | Kawakami et al. |
| 2002/0138645 A1 | 9/2002 | Shinomiya et al. |
| 2002/0141412 A1 | 10/2002 | Wong |
| 2002/0165897 A1 | 11/2002 | Kagan et al. |
| 2002/0176363 A1 | 11/2002 | Durinovic-Johri et al. |
| 2003/0016624 A1 | 1/2003 | Bare |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0097438 A1 | 5/2003 | Bearden et al. |
| 2003/0223453 A1 | 12/2003 | Stoler et al. |
| 2004/0024903 A1 | 2/2004 | Costatino et al. |
| 2004/0062242 A1 | 4/2004 | Wadia et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0154790 A1 | 7/2005 | Nagata et al. |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1 | 6/2006 | See et al. |
| 2006/0182034 A1 | 8/2006 | Klinker et al. |
| 2006/0215645 A1 | 9/2006 | Kangyu |
| 2006/0291480 A1 | 12/2006 | Cho et al. |
| 2007/0030817 A1 | 2/2007 | Arunachalam et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0104192 A1 | 5/2007 | Yoon et al. |
| 2007/0183418 A1 | 8/2007 | Riddoch et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0101378 A1 | 5/2008 | Krueger |
| 2008/0112413 A1 | 5/2008 | Pong |
| 2008/0165797 A1 | 7/2008 | Aceves |
| 2008/0186981 A1 | 8/2008 | Seto et al. |
| 2008/0189432 A1 | 8/2008 | Abali et al. |
| 2008/0267078 A1 | 10/2008 | Farinacci et al. |
| 2008/0298248 A1 | 12/2008 | Roeck et al. |
| 2009/0010159 A1 | 1/2009 | Brownell et al. |
| 2009/0022154 A1 | 1/2009 | Kiribe et al. |
| 2009/0097496 A1 | 4/2009 | Nakamura et al. |
| 2009/0103534 A1 | 4/2009 | Malledant et al. |
| 2009/0119565 A1 | 5/2009 | Park et al. |
| 2009/0262741 A1 | 10/2009 | Jungck et al. |
| 2010/0020796 A1 | 1/2010 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0189113 A1 | 7/2010 | Csaszar et al. |
| 2010/0216444 A1 | 8/2010 | Mariniello et al. |
| 2010/0284404 A1 | 11/2010 | Gopinath et al. |
| 2010/0290385 A1 | 11/2010 | Ankaiah et al. |
| 2010/0290458 A1 | 11/2010 | Assarpour et al. |
| 2010/0315958 A1 | 12/2010 | Luo et al. |
| 2011/0019673 A1 | 1/2011 | Fernandez |
| 2011/0080913 A1 | 4/2011 | Liu et al. |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0164496 A1 | 7/2011 | Loh et al. |
| 2011/0164518 A1 | 7/2011 | Daraiseh et al. |
| 2011/0225391 A1 | 9/2011 | Burroughs et al. |
| 2011/0249679 A1 | 10/2011 | Lin et al. |
| 2011/0255410 A1 | 10/2011 | Yamen et al. |
| 2011/0265006 A1 | 10/2011 | Morimura et al. |
| 2011/0299529 A1 | 12/2011 | Olsson et al. |

(56) References Cited

U.S. PATENT DOCUMENTS

| | | |
|---|---|---|
| 2012/0020207 A1 | 1/2012 | Corti et al. |
| 2012/0075999 A1 | 3/2012 | Ko et al. |
| 2012/0082057 A1 | 4/2012 | Welin et al. |
| 2012/0144065 A1 | 6/2012 | Parker et al. |
| 2012/0147752 A1 | 6/2012 | Ashwood-Smith et al. |
| 2012/0163797 A1 | 6/2012 | Wang |
| 2012/0170582 A1 | 7/2012 | Abts et al. |
| 2012/0207175 A1 | 8/2012 | Raman et al. |
| 2012/0250500 A1 | 10/2012 | Liu |
| 2012/0250679 A1 | 10/2012 | Judge et al. |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0159548 A1 | 6/2013 | Vasseur et al. |
| 2013/0170451 A1 | 7/2013 | Krause et al. |
| 2013/0182604 A1 | 7/2013 | Moreno et al. |
| 2013/0204933 A1 | 8/2013 | Cardona et al. |
| 2013/0208720 A1 | 8/2013 | Ellis et al. |
| 2013/0242745 A1 | 9/2013 | Umezuki |
| 2013/0259033 A1 | 10/2013 | Hefty |
| 2013/0297757 A1 | 11/2013 | Han et al. |
| 2013/0315237 A1 | 11/2013 | Kagan et al. |
| 2013/0322256 A1 | 12/2013 | Bader et al. |
| 2013/0329727 A1 | 12/2013 | Rajagopalan et al. |
| 2013/0336116 A1 | 12/2013 | Vasseur et al. |
| 2013/0336164 A1 | 12/2013 | Yang et al. |
| 2014/0016457 A1 | 1/2014 | Enyedi et al. |
| 2014/0022942 A1 | 1/2014 | Han et al. |
| 2014/0043959 A1 | 2/2014 | Owens et al. |
| 2014/0059440 A1 | 2/2014 | Sasaki et al. |
| 2014/0105034 A1 | 4/2014 | Sun |
| 2014/0140341 A1 | 5/2014 | Bataineh et al. |
| 2014/0169173 A1 | 6/2014 | Naouri et al. |
| 2014/0192646 A1 | 7/2014 | Mir et al. |
| 2014/0198636 A1 | 7/2014 | Thayalan et al. |
| 2014/0211808 A1 | 7/2014 | Koren et al. |
| 2014/0269305 A1 | 9/2014 | Nguyen |
| 2014/0313880 A1 | 10/2014 | Lu et al. |
| 2014/0328180 A1 | 11/2014 | Kim et al. |
| 2014/0343967 A1 | 11/2014 | Baker |
| 2015/0030033 A1 | 1/2015 | Vasseur et al. |
| 2015/0052252 A1 | 2/2015 | Gilde et al. |
| 2015/0092539 A1 | 4/2015 | Sivabalan et al. |
| 2015/0124815 A1 | 5/2015 | Beliveau et al. |
| 2015/0127797 A1 | 5/2015 | Attar et al. |
| 2015/0131663 A1 | 5/2015 | Brar et al. |
| 2015/0163144 A1 | 6/2015 | Koponen et al. |
| 2015/0172070 A1 | 6/2015 | Csaszar |
| 2015/0172226 A1* | 6/2015 | Borshteen ............ H04L 49/9057 370/412 |
| 2015/0180782 A1* | 6/2015 | Rimmer ................ H04L 49/358 370/235 |
| 2015/0194215 A1 | 7/2015 | Douglas et al. |
| 2015/0195204 A1 | 7/2015 | Haramaty et al. |
| 2015/0222533 A1* | 8/2015 | Birrittella ............... H04L 45/66 370/392 |
| 2015/0249590 A1 | 9/2015 | Gusat et al. |
| 2015/0295858 A1 | 10/2015 | Chrysos et al. |
| 2015/0372916 A1 | 12/2015 | Haramaty et al. |
| 2016/0012004 A1 | 1/2016 | Arimilli et al. |
| 2016/0014636 A1 | 1/2016 | Bahr et al. |
| 2016/0028613 A1 | 1/2016 | Haramaty et al. |
| 2016/0043933 A1 | 2/2016 | Gopalarathnam |
| 2016/0080120 A1 | 3/2016 | Unger et al. |
| 2016/0080321 A1 | 3/2016 | Pan et al. |
| 2016/0182378 A1 | 6/2016 | Basavaraja et al. |
| 2016/0294715 A1 | 10/2016 | Raindel et al. |
| 2016/0380893 A1 | 12/2016 | Chopra et al. |
| 2017/0054445 A1 | 2/2017 | Wang |
| 2017/0054591 A1 | 2/2017 | Hyoudou et al. |
| 2017/0068669 A1 | 3/2017 | Levy et al. |
| 2017/0070474 A1 | 3/2017 | Haramaty et al. |
| 2017/0163775 A1 | 6/2017 | Ravi et al. |
| 2017/0180243 A1 | 6/2017 | Haramaty et al. |
| 2017/0187614 A1 | 6/2017 | Haramaty et al. |
| 2017/0187637 A1* | 6/2017 | Underwood ........... H04L 1/1832 |
| 2017/0195758 A1 | 7/2017 | Schrans et al. |
| 2017/0244630 A1 | 8/2017 | Levy et al. |
| 2017/0270119 A1 | 9/2017 | Kfir et al. |
| 2017/0286292 A1 | 10/2017 | Levy et al. |
| 2017/0331740 A1 | 11/2017 | Levy et al. |
| 2017/0358111 A1 | 12/2017 | Madsen |
| 2018/0024841 A1* | 1/2018 | Hiscock ............... G06F 13/4282 713/100 |
| 2018/0026878 A1 | 1/2018 | Zahavi et al. |
| 2018/0062990 A1 | 3/2018 | Kumar et al. |
| 2018/0089127 A1 | 3/2018 | Flajslik et al. |
| 2018/0139132 A1 | 5/2018 | Edsall et al. |
| 2018/0302288 A1 | 10/2018 | Schmatz |
| 2019/0068484 A1* | 2/2019 | Oprea ................... H04L 45/40 |
| 2019/0230560 A1 | 7/2019 | Huang ................. H04L 47/24 |
| 2020/0042667 A1 | 2/2020 | Swaminathan et al. |
| 2020/0067822 A1 | 2/2020 | Malhotra et al. |
| 2020/0136956 A1 | 4/2020 | Neshat |
| 2020/0234146 A1 | 7/2020 | Lee et al. |
| 2020/0236052 A1* | 7/2020 | Srinivasan ............ H04L 45/60 |
| 2021/0344782 A1* | 11/2021 | Shpigelman .......... H04L 1/0002 |
| 2022/0014607 A1 | 1/2022 | Pilnik et al. |
| 2022/0045972 A1 | 2/2022 | Aibester et al. |
| 2022/0078104 A1 | 3/2022 | Yallouz et al. |
| 2022/0086848 A1 | 3/2022 | Sharma et al. |
| 2022/0103480 A1 | 3/2022 | Chiesa et al. |
| 2022/0182309 A1 | 6/2022 | Bataineh et al. |
| 2022/0231957 A1* | 7/2022 | Friedman ............. H04L 1/1848 |
| 2022/0360511 A1 | 11/2022 | Raindel |
| 2023/0038307 A1 | 2/2023 | Blendin et al. |
| 2023/0164086 A1* | 5/2023 | York ..................... H04L 47/34 370/392 |
| 2023/0209406 A1 | 6/2023 | Hu |
| 2023/0239233 A1 | 7/2023 | Grandhye et al. |
| 2023/0318980 A1 | 10/2023 | Wei et al. |
| 2024/0080266 A1* | 3/2024 | Friedman ............. H04L 45/24 |
| 2024/0089194 A1* | 3/2024 | Almog .................. H04L 45/66 |

FOREIGN PATENT DOCUMENTS

| | | | | |
|---|---|---|---|---|
| CN | 110602211 A | * | 12/2019 | ......... H04L 67/2842 |
| CN | 110704361 A | * | 1/2020 | ......... G06F 11/3041 |
| CN | 110719193 A | | 1/2020 | |
| CN | 112311694 A | * | 2/2021 | ............. G06N 3/08 |
| CN | 112565245 A | * | 3/2021 | ............ H04L 63/08 |
| CN | 113746744 A | * | 12/2021 | ............ H04L 47/10 |
| CN | 11549927 A | | 12/2022 | |
| EP | 3509255 A1 | * | 7/2019 | ........... H04W 28/02 |
| WO | 2012037494 A1 | | 3/2012 | |
| WO | WO-2013074075 A1 | * | 5/2013 | ............ H04L 45/10 |
| WO | 2015175567 A1 | | 11/2015 | |
| WO | 2016014362 A1 | | 1/2016 | |
| WO | 2016105446 A1 | | 6/2016 | |

OTHER PUBLICATIONS

Ronen et al., U.S. Appl. No. 17/353,869, filed Jun. 22, 2021.
Valadarsky et al., "Xpander: Towards Optimal-Performance Datacenters," Proceedings of CoNEXT '16, pp. 205-219, Dec. 2016.
Bilu et al., "Lifts, Discrepancy and Nearly Optimal Spectral Gap*," Combinatorica, vol. 26, No. 5, Bolyai Society—Springer-Verlag, pp. 495-519, year 2006.
InfiniBand Trade Association, "Supplement to Infiniband Architecture Specification," vol. 1, release 1.2.1—Annex A17: RoCEv2, pp. 1-23, Sep. 2, 2014.
InfiniBand Trade Association, "InfiniBand Architecture Specification," vol. 1, Release 1.5, Jun. 2, 2021, Draft, Table 6 (Base Transport Header Fields), pp. 1-2, year 2021.
Cisco, "Cisco ACI Remote Leaf Architecture—White Paper," pp. 1-83, updated Jan. 22, 2020.

(56) References Cited

OTHER PUBLICATIONS

Gandelman et al., U.S. Appl. No. 17/539,252, filed Dec. 1, 2021.
Friedman et al., U.S. Appl. No. 17/902,920, filed Sep. 5, 2022.
Thulasiraman et al., "Logical Topology Augmentation for Guaranteed Survivability Under Multiple Failures in IP-over-WDM Optical Network," 2009 IEEE 3rd International Symposium on Advanced Networks and Telecommunication Systems (ANTS), pp. 1-3, year 2009.
Nastiti et al., "Link Failure Emulation with Dijkstra and Bellman-Ford Algorithm in Software Defined Network Architecture," Abstract of Case Study: Telkom University—Topology, 2018 6th IEEE Conference on Information and Communication Technology (ICoICT), pp. 135-140, year 2018.
Kamiyama et al., "Network Topology Design Considering Detour Traffic Caused by Link Failure," Networks 2008—The 13th International Telecommunications Network Strategy and Planning Symposium, pp. 1-8, year 2008.
Nkposong et al., "Experiences with BGP in Large Scale Data Centers: Teaching an Old Protocol New Tricks", pp. 1-47, JANOG33 Meeting (Japan Network Operators' Group), Beppu City, Japan, Jan. 23-24, 2014.
U.S. Appl. No. 17/539,252 Office Action dated Apr. 26, 2023.
U.S. Appl. No. 17/353,869 Office Action dated Jun. 9, 2023.
U.S. Appl. No. 17/353,869 Office Action dated Jan. 12, 2023.
Leiserson, "Fat-Trees: Universal Networks for Hardware Efficient Supercomputing", IEEE Transactions on Computers, vol. C-34, pp. 892-901, Oct. 1985.
Oehring et al., "On Generalized Fat Trees", Proceedings of the 9th International Symposium on Parallel Processing, Santa Barbara, USA, pp. 37-44, Apr. 1995.
Zahavi, "D-Mod-K Routing Providing Non-Blocking Traffic for Shift Permutations on Real Life Fat Trees", CCIT Technical Report #776, Technion—Israel Institute of Technology, Haifa, Israel, pp. 1-7, Aug. 2010.
Yuan et al., "Oblivious Routing for Fat-Tree Based System Area Networks with Uncertain Traffic Demands", Proceedings of ACM Sigmetrics—the International Conference on Measurement and Modeling of Computer Systems, pp. 337-348, San Diego, USA, pp. 337-348, Jun. 2007.
Matsuoka, "You Don't Really Need Big Fat Switches Anymore—Almost", IPSJ SIG Technical Reports, vol. 2003, No. 83, pp. 157-162, year 2003.
Kim et al., "Technology-Driven, Highly-Scalable Dragonfly Topology", 35th International Symposium on Computer Architecture, pp. 77-78, Beijing, China, pp. 77-88, Jun. 2008.
Jiang et al., "Indirect Adaptive Routing on Large Scale Interconnection Networks", 36th International Symposium on Computer Architecture, Austin, USA, pp. 220-231, Jun. 2009.
Minkenberg et al., "Adaptive Routing in Data Center Bridges", Proceedings of 17th IEEE Symposium on High Performance Interconnects, New York, USA, pp. 33-41, Aug. 2009.
Kim et al., "Adaptive Routing in High-Radix Clos Network", Proceedings of the 2006 ACM/IEEE Conference on Supercomputing (SC2006), Tampa, USA, pp. 1-11, Nov. 2006.
InfiniBand Trade Association, "InfiniBandTM Architecture Specification", vol. 1, Release 1.3, pp. 1-1842, Mar. 3, 2015.
Culley et al., "Marker PDU Aligned Framing for TCP Specification", IETF Network Working Group, RFC 5044, pp. 1-74, Oct. 2007.
Shah et al., "Direct Data Placement over Reliable Transports", IETF Network Working Group, RFC 5041, pp. 1-38, Oct. 2007.
Martinez et al., "Supporting fully adaptive routing in Infiniband networks", Proceedings of the International Parallel and Distributed Processing Symposium (IPDPS'03), pp. 1-10, Apr. 2003.
Joseph, "Adaptive routing in distributed decentralized systems: NeuroGrid, Gnutella & Freenet", Proceedings of Workshop on Infrastructure for Agents, MAS and Scalable MAS, Montreal, Canada, pp. 1-11, year 2001.
Gusat et al., "R3C2: Reactive Route & Rate Control for CEE", Proceedings of 18th IEEE Symposium on High Performance Interconnects, New York, USA, pp. 50-57, Aug. 2010.
Wu et al., "DARD: Distributed adaptive routing datacenter networks", Proceedings of IEEE 32nd International Conference Distributed Computing Systems, pp. 32-41, Jun. 2012.
Ding et al., "Level-wise scheduling algorithm for fat tree interconnection networks", Proceedings of the 2006 ACM/IEEE Conference on Supercomputing (SC 2006), pp. 1-9, Nov. 2006.
Prisacari et al., "Performance implications of remote-only load balancing under adversarial traffic in Dragonflies", Proceedings of the 8th International Workshop on Interconnection Network Architecture: On-Chip, Multi-Chip, pp. 1-4, Jan. 2014.
Li et al., "Multicast Replication Using Dual Lookups in Large Packet-Based Switches", 2006 IET International Conference on Wireless, Mobile and Multimedia Networks, pp. 1-3, Nov. 2006.
Nichols et al., "Definition of the Differentiated Services Field (DS Field) in the IPv4 and IPV6 Headers", Network Working Group, RFC 2474, pp. 1-20, Dec. 1998.
Microsoft., "How IPv4 Multicasting Works", pp. 1-22, Mar. 28, 2003.
Suchara et al., "Network Architecture for Joint Failure Recovery and Traffic Engineering", Proceedings of the ACM Sigmetrics joint international conference on Measurement and modeling of computer systems, pp. 97-108, Jun. 2011.
IEEE 802.1Q, "IEEE Standard for Local and metropolitan area networks Virtual Bridged Local Area Networks", IEEE Computer Society, pp. 1-303, May 19, 2006.
Plummer, D., "An Ethernet Address Resolution Protocol," Network Working Group, Request for Comments (RFC) 826, pp. 1-10, Nov. 1982.
Hinden et al., "IP Version 6 Addressing Architecture," Network Working Group ,Request for Comments (RFC) 2373, pp. 1-26, Jul. 1998.
Garcia et al., "On-the-Fly 10 Adaptive Routing in High-Radix Hierarchical Networks," Proceedings of the 2012 International Conference on Parallel Processing (ICPP), pp. 279-288, Sep. 2012.
Dally et al., "Deadlock-Free Message Routing in Multiprocessor Interconnection Networks", IEEE Transactions on Computers, vol. C-36, No. 5, pp. 547-553, May 1987.
Nkposong et al., "Experiences with BGP in Large Scale Data Centers:Teaching an old protocol new tricks", pp. 1-44, Jan. 31, 2014.
"Equal-cost multi-path routing", Wikipedia, pp. 1-2, Oct. 13, 2014.
Thaler et al., "Multipath Issues in Unicast and Multicast Next-Hop Selection", Network Working Group, RFC 2991, pp. 1-9, Nov. 2000.
Glass et al., "The turn model for adaptive routing", Journal of the ACM, vol. 41, No. 5, pp. 874-902, Sep. 1994.
Mahalingam et al., "VXLAN: A Framework for Overlaying Virtualized Layer 2 Networks over Layer 3 Networks", Internet Draft, pp. 1-20, Aug. 22, 2012.
Sinha et al., "Harnessing TCP's Burstiness with Flowlet Switching", 3rd ACM Sigcomm Workshop on Hot Topics in Networks (HotNets), pp. 1-6, Nov. 11, 2004.
Vishnu et al., "Hot-Spot Avoidance With Multi-Pathing Over InfiniBand: An MPI Perspective", Seventh IEEE International Symposium on Cluster Computing and the Grid (CCGrid'07), pp. 1-8, year 2007.
NOWLAB—Network Based Computing Lab, pp. 1-2, years 2002-2015, as downloaded from http://nowlab.cse.ohio-state.edu/publications/conf-presentations/2007/vishnu-ccgrid07.pdf.
Alizadeh et al., "CONGA: Distributed Congestion-Aware Load Balancing for Datacenters", Cisco Systems, pp. 1-12, Aug. 9, 2014.
Geoffray et al., "Adaptive Routing Strategies for Modern High Performance Networks", 16th IEEE Symposium on High Performance Interconnects (HOTI '08), pp. 165-172, Aug. 2008.
Anderson et al., "On the Stability of Adaptive Routing in the Presence of Congestion Control", IEEE Infocom, pp. 1-11, year 2003.
Perry et al., "Fastpass: A Centralized "Zero-Queue" Datacenter Network", M.I.T. Computer Science & Artificial Intelligence Lab, pp. 1-12, year 2014.

(56) References Cited

OTHER PUBLICATIONS

Afek et al., "Sampling and Large Flow Detection in SDN", Sigcomm '15, London, UK, pp. 345-346, Aug. 2015.
Amante et al., "IPv6 Flow Label Specification", Request for Comments: 6437, pp. 1-15, Nov. 2011.
Cao et al., "Implementation Method for High-radix Fat-tree Deterministic Source-routing Interconnection Network", Computer Science, vol. 39, issue 12, pp. 33-37, year 2012.
Shpiner et al., "Dragonfly+: Low Cost Topology for Scaling Datacenters", IEEE 3rd International Workshop on High-Performance Interconnection Networks in the Exascale and Big-Data Era (HiPINEB), pp. 1-9, Feb. 2017.
Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 2012.
Mellanox White Paper, "The Shield: Self-Healing Interconnect," pp. 1-2, year 2019.
Zhao et al., "Recovery Strategy from Network Multi-link Failures Based on Overlay Network Constructing Technique," Bulletin of Science and Technology, vol. 32, No. 10, pp. 170-239, Oct. 2016.
CN Application # 202210593405.5 Office Action dated Sep. 15, 2023.

\* cited by examiner ived. The one or more circuits are to mark the packet ineligible to undergo AR regardless of whether the packet is eligible or not.

MARKING OF RDMA-OVER-CONVERGED-ETHERNET (ROCE) TRAFFIC ELIGIBLE FOR ADAPTIVE ROUTING

CROSS-REFERENCE TO RELATED APPLICATIONS

This application claims the benefit of U.S. Provisional Patent Application 63/404,551, filed Sep. 8, 2022, whose disclosure is incorporated herein by reference.

FIELD OF THE INVENTION

The present invention relates generally to communication networks, and particularly to methods and systems for applying Adaptive Routing (AR) to Remote Direct Memory Access over Ethernet (RoCE) traffic.

BACKGROUND OF THE INVENTION

RoCE, also referred to as InfiniBand over Ethernet (IBoE), is a network protocol that enables performing Remote Direct Memory Access (RDMA) transactions over an Ethernet network. Generally speaking, RoCE involves encapsulating InfiniBand (IB) transport packets in Ethernet packets. RoCE is specified, for example, in "Supplement to InfiniBand™ Architecture Specification—Volume 1 Release 1.2.1—Annex A17: RoCEv2," Sep. 2, 2014.

Adaptive Routing (AR) techniques route traffic over multiple alternative routes in a network, for example depending on load conditions, congestion, or other conditions of the routes. Various AR techniques are known in the art. For example, U.S. Pat. No. 8,576,715, whose disclosure is incorporated herein by reference, describes routing using multiple routing modes, e.g., a time-bounded AR mode, an unbounded AR mode and a static routing mode. U.S. Pat. No. 9,014,006, whose disclosure is incorporated herein by reference, describes adaptive routing techniques that use inter-switch notifications. U.S. Pat. No. 9,894,005, whose disclosure is incorporated herein by reference, describes adaptive routing controlled by source node. Additional AR techniques are described, for example, in U.S. Pat. Nos. 9,973,435, 10,819,621, 10,178,029, 10,200,294, 10,644,995, whose disclosures are all incorporated herein by reference.

SUMMARY OF THE INVENTION

A network adapter includes a port and one or more circuits. The port is to send packets to a network in accordance with a Remote Direct Memory Access over Converged Ethernet (RoCE) protocol. The one or more circuits are to decide whether a packet is permitted to undergo Adaptive Routing (AR) in being routed through the network, to mark the packet with an indication of whether the packet is permitted to undergo AR, and to send the marked packet to the network via the port.

In some embodiments, the one or more circuits are to decide whether the packet is permitted to undergo AR by negotiating with a peer network adapter at a destination of the packet, and finding whether the peer network adapter is capable of processing RoCE packets that are received Out-Of-Order (OOO). In an example embodiment, in response to receiving an override instruction from a host, the one or more circuits are to mark the packet as ineligible to undergo AR even though the peer network adapter is capable of processing RoCE packets received OOO. In another embodiment, in response to the packet meeting a defined condition, the one or more circuits are to mark the packet as ineligible to undergo AR regardless of whether the packet is eligible or not.

In some embodiments, the one or more circuits are to mark the packet by setting a bit in a transport-layer header of the packet. In an example embodiment, the bit is a reserved bit in a RoCE Base Transport Header (BTH) of the packet.

There is additionally provided, in accordance with an embodiment of the present invention, a network device including multiple ports and one or more packet processing circuits. The ports are to send and receive packets to and from a network in accordance with a RoCE protocol. The one or more packet processing circuits are to receive a packet, to extract from the packet an indication of whether the packet is permitted to undergo AR, and to route the packet using AR or using static routing, depending on the indication.

In some embodiments, the one or more packet processing circuits are to extract the indication by reading a bit in a transport-layer header of the packet. In an embodiment, the bit is a reserved bit in a RoCE Base Transport Header (BTH) of the packet. In a disclosed embodiment, the network device is a layer-2 switch, and the one or more packet processing circuits are to extract the indication by reading a bit in a transport-layer header of the packet.

There is also provided, in accordance with an embodiment of the present invention, a method for communicating Remote Direct Memory Access over Converged Ethernet RoCE packets. The method includes, in a network adapter, deciding whether a RoCE packet is permitted to undergo AR in being routed through a network. The RoCE packet is marked in the network adapter with an indication of whether the packet is permitted to undergo AR. The marked packet is sent from the network adapter to the network.

There is also provided, in accordance with an embodiment of the present invention, a method for routing RoCE packets. The method includes receiving a RoCE packet from a network in a network device. An indication of whether the packet is permitted to undergo AR is extracted from the packet. The packet is routed using AR or using static routing, depending on the indication.

The present invention will be more fully understood from the following detailed description of the embodiments thereof, taken together with the drawings in which:

DETAILED DESCRIPTION OF EMBODIMENTS

Overview

Figure 1:
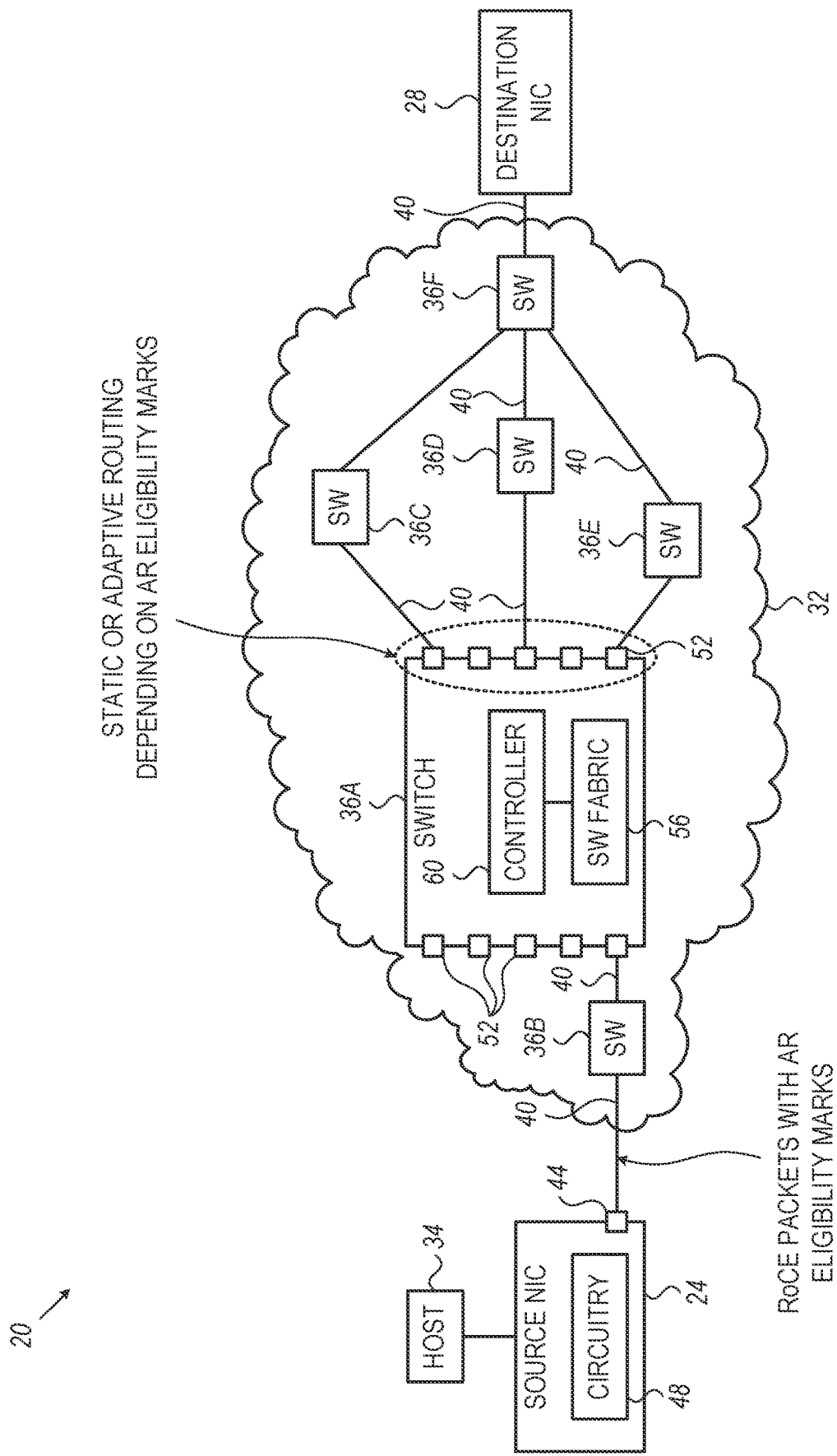
FIG. 1 is a block diagram that schematically illustrates an Ethernet communication system, in accordance with an embodiment of the present invention.

Adaptive Routing (AR) techniques are routing techniques in which a network device, e.g., a network switch, is given freedom to choose a routing path for a packet from among multiple candidate routes. AR allows better utilization of network resources, e.g., by improving load balancing and avoiding congestion. On the other hand, switching from one route to another may cause packets to arrive at their destination Out-Of-Order (OOO), i.e., in an order that differs from the order of transmission from the source. OOO packet arrival may be problematic, and sometimes forbidden, for some applications.

RoCE is one typical example of an application that may have difficulty in processing packets that arrive OOO. Some Ethernet Network Interface Controllers (NICs) are capable of processing RoCE packets that arrive OOO, while other NICs require strict in-order arrival.

Embodiments of the present invention that are described herein provide improved methods and systems for communicating RoCE traffic. In the disclosed embodiments, a source NIC transmits RoCE packets to an Ethernet network. Among other packet processing tasks, the source NIC decides, for a given RoCE packet, whether or not the packet is permitted to undergo AR in being routed through the network. The source NIC then marks the packet with a suitable "eligibility mark", and transmits the marked packet to the network. The terms "permitted to undergo AR" and "eligible for AR" are used interchangeably herein.

In some embodiments, a network switch that supports the disclosed techniques is located at a location in the network having multiple alternative routes leading to the destination of the above-described packet. Upon receiving the packet, the switch extracts the eligibility mark from the packet and identifies whether the packet is permitted to undergo AR or not. If permitted, the switch routes the packet using AR. If not permitted, the switch routes the packet using static routing.

In the present context, the term "adaptive routing" refers to a routing scheme in which a network device (e.g., switch or router) has the freedom to route a given packet or flow over one of multiple different candidate routes, and to change the route selection over time. From the perspective of the switch, adaptive selection of a route from among candidate routes is equivalent to adaptive selection of an egress port for a packet or flow from a set of alternative egress ports. The term "static routing" refers to a routing scheme in which a network device (e.g., switch or router) selects the same route for a given packet or flow.

In an embodiment, the source NIC marks the packet with an eligibility mark by setting a reserved bit in a Base Transport Header (BTH) of the packet. The BTH is a layer-4 (transport layer) header, which is part of an inner IB packet of the RoCE packet. In an embodiment, the switch extracts the eligibility mark by examining the inner layer-4 IB header, even though the switch itself is a layer-2 Ethernet switch and the IB packet is encapsulated in an Ethernet packet.

The source NIC may use various criteria for deciding whether a given RoCE packet is eligible to undergo AR or not. In some embodiments, when initiating communication, the source NIC and the destination NIC carry out an auto-negotiation process in which the NICs report their capabilities to one another. One of the reported capabilities is whether or not the destination NIC is capable of processing RoCE packets that arrive OOO. When sending packets to a destination NIC that supports OOO packet arrival, the source NIC marks the packets as eligible to undergo AR, and vice versa.

In some embodiments, the host served by the source NIC may override the NIC in making AR eligibility decisions for packets. Additionally or alternatively, the source NIC may force static routing for specific packets within a flow that is specified as eligible for AR.

In summary, the methods and systems described herein ensure that AR is applied only to RoCE traffic that is permitted to undergo AR. Without the disclosed techniques, either all destination NICs must support OOO processing of received RoCE traffic, or else AR cannot be used.

System Description

FIG. 1 is a block diagram that schematically illustrates an Ethernet communication system 20, in accordance with an embodiment of the present invention. System 20 comprises Ethernet NICs 24 and 28 that communicate with one another using RoCE over an Ethernet network 32. NIC 24 serves a host 34. Network 32 comprises a plurality of Ethernet switches, in the present example six switches denoted 36A-36F, which are interconnected by network links 40.

In the demonstrative examples below, NIC 24 sends RoCE packets to NIC 28. Therefore, NIC 24 is referred to as a source NIC, and NIC 28 is referred to as a destination NIC. NIC 24 comprises a port 44 for sending and receiving packets to and from network 32, and circuitry 48, comprising one or more circuits, for generating and otherwise processing transmitted and received packets. Among other tasks, circuitry 48 marks outgoing RoCE packets with "AR eligibility indications," which indicate whether or not the RoCE packets are permitted to undergo Adaptive Routing (AR).

As shown in detail for switch 36A, each Ethernet switch in network 32 comprises multiple ports 52, a switch fabric 56, and a controller 60. Ports 52 serve as network interfaces for transmitting and receiving packets to and from network 32. Fabric 56 forwards packets between the ports—A given packet is received at a certain ingress port and is forwarded to a certain egress port. Controller 60 configures and manages the operation of fabric 56 and of switch 36A as a whole.

Fabric 56 and controller 60 are referred to jointly as "packet processing circuitry" or "one or more packet processing circuits" that carry out the disclosed techniques. Among other tasks, the (one or more) packet processing circuits extract AR eligibility marks from incoming RoCE packets, and use the eligibility marks to decide whether to route the packets using AR or using static routing.

The configurations of system 20, network 32, NIC 24 and switch 36A, as depicted in FIG. 1, are example configurations that are chosen purely for the sake of conceptual clarity. Any other suitable configurations can be used in alternative embodiments. For example, FIG. 1 shows only two NICs for the sake of clarity. Real-life systems typically comprise a large number of NICs, each serving as a source NIC for some packets and as a destination NIC for other packets.

In various embodiments, NIC 24 and switch 36A may be implemented using suitable software, using suitable hardware such as one or more Application-Specific Integrated Circuits (ASIC) or Field-Programmable Gate Arrays (FPGA), or using a combination of hardware and software. Some elements of NIC 24 and/or switch 36A, e.g., controller 60 and/or parts of NIC circuitry 48, may be implemented using one more general-purpose processors, which are programmed in software to carry out the techniques described herein. The software may be downloaded to the processors in electronic form, over a network, for example, or it may, alternatively or additionally, be provided and/or stored on non-transitory tangible media, such as magnetic, optical, or electronic memory.

Selective Application of AR by Marking Packets with AR Eligibility Marks

Consider an example scenario in which source NIC 24 sends RoCE packets addressed to destination NIC 28. As the packets travel through network 32, they are received by switch 36A. As seen in the figure, switch 36A is able to route packets to destination NIC 28 over three alternative routes— One route passing via switch 36C, another route passing via switch 36D, and a third route via switch 36E. All three routes converge at switch 36F, which is the last-hop switch connected to destination NIC 28.

To route a packet via a selected route, fabric 56 of switch 36A forwards the packet to an egress port leading to that route. When using static routing, the selection of egress port for a given packet (e.g., for a given flow defined by a respective "tuple") is fixed. When using AR, controller 60 may change the selection of egress port for a given packet from time to time, e.g., depending on load conditions over the various alternative routes. Any suitable AR scheme can be used, e.g., the AR techniques in the references cited in the Background section above.

In some cases, it is permissible for switch 36A to route RoCE packets to destination NIC 28 using AR. In other cases, it is mandatory that RoCE packets be routed to destination NIC 28 using static routing. For example, destination NIC 28 may or may not be capable of processing RoCE packets that arrive Out-Of-Order (OOO), i.e., in a different order than the order in which they were sent from source NIC 24.

Thus, in some embodiments source NIC 24 marks each RoCE packet with an "eligibility mark" that indicates whether the packet is permitted to undergo AR. Switch 36A (and any other switch in network 32 that supports the disclosed technique) uses these marks to decide whether to route the packets using AR or using static routing.

In some embodiments, circuitry 48 of NIC 24 marks a RoCE packet with an eligibility mark by setting the value of a reserved bit in a Base Transport Header (BTH) of the inner IB packet in the RoCE packet. The structure of the BTH is specified, for example, in "InfiniBand™ Architecture Specification Volume 1—Release 1.5," Jun. 2, 2021, Table 6. The table specifies a seven-bit "Reserved" field. Any of the bits of this field, e.g., the Most Significant Bit (MSB), can be used for storing an eligibility mark. In an example embodiment, setting this bit to "1" means that the packet is eligible for AR (permitted to undergo AR), and setting the bit to "0" means that the packet is ineligible for AR (not permitted to undergo AR). In alternative embodiment, any other suitable bit or multiple bits, in any other location in the packet, can be used for storing the eligibility mark for the packet.

In some embodiments, source NIC 24 marks some RoCE packets as eligible for AR, and other RoCE packets as ineligible for AR. For example, source NIC 24 may communicate with multiple destination NICs 28, some of which supporting processing of OOO packets and others do not.

Figure 2:
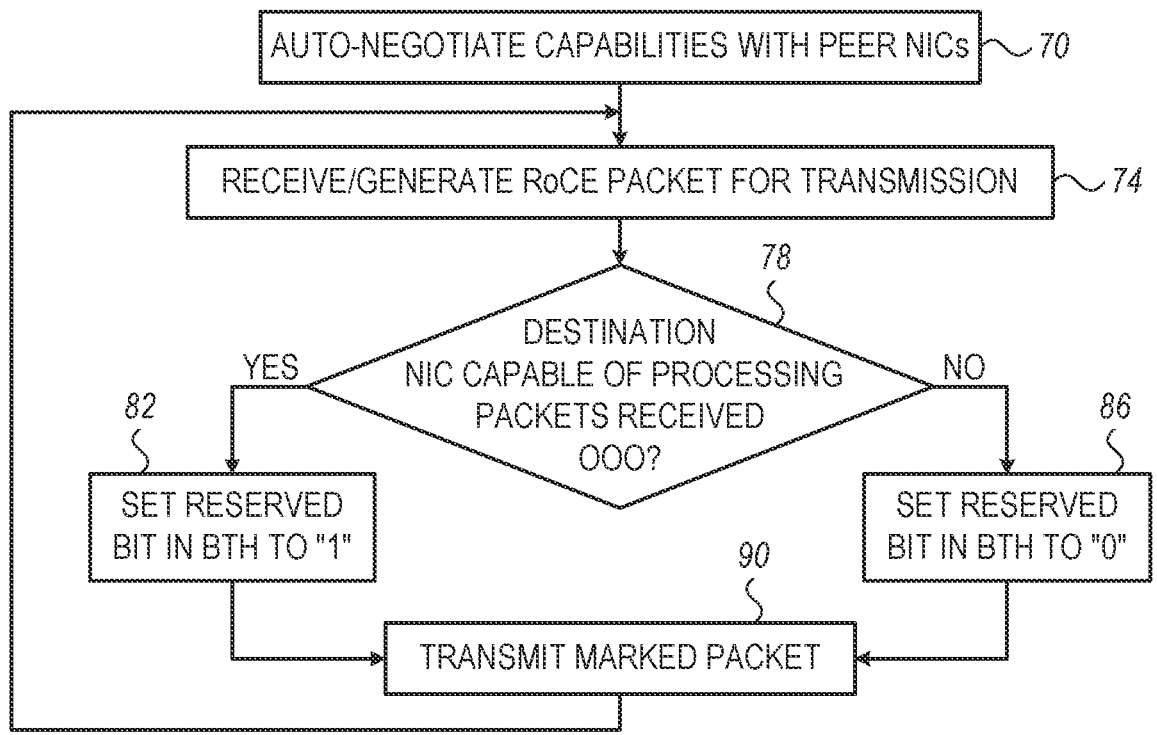
FIG. 2 is a flow chart that schematically illustrates a method for transmitting RoCE packets having Adaptive Routing (AR) eligibility marks from an Ethernet Network Interface Controller (NIC), in accordance with an embodiment of the present invention.

FIG. 2 is a flow chart that schematically illustrates a method for transmitting RoCE packets having Adaptive Routing (AR) eligibility marks from source NIC 24, in accordance with an embodiment of the present invention. The method begins with circuitry 48 of source NIC 24 carrying out auto-negotiation processes with one or more peer NICs, at an auto-negotiation stage 70. For convenience, the auto-negotiation processes are mentioned in a single stage of the method. In reality, auto-negotiation processes with different peer NICs will typically be conducted at different times—Upon establishing a connection with each peer NIC. As part of the auto-negotiation process, each peer NIC notifies NIC 24 whether or not it is capable of processing RoCE packets that arrive OOO.

At a packet generation stage 74, circuitry 48 of source NIC 24 generates (or receives from host 34 for transmission) a RoCE packet addressed to a certain destination NIC 28. At a capability checking stage 78, circuitry 48 checks (based on the results of the auto-negotiation process of stage 70) whether the destination NIC is capable of processing RoCE packets that arrive OOO.

If the destination NIC is found to be capable of processing RoCE packets that arrive OOO, circuitry 48 marks the RoCE packet with the appropriate eligibility mark, at an eligibility marking stage 82. In the present example circuitry 48 sets the MSB of the Reserved field in the BTH of the packet to "1". If, on the other hand, the destination NIC is found to be incapable of processing RoCE packets that arrive OOO, circuitry 48 marks the RoCE packet with the opposite eligibility mark, at an ineligibility marking stage 86. In the present example circuitry 48 sets the MSB of the Reserved field in the BTH of the packet to "0".

At a packet transmission stage 90, circuitry 48 sends the RoCE packet, including the eligibility mark, via port 44 to network 32. The method then loops back to stage 74 above for handling the next packet.

Figure 3:
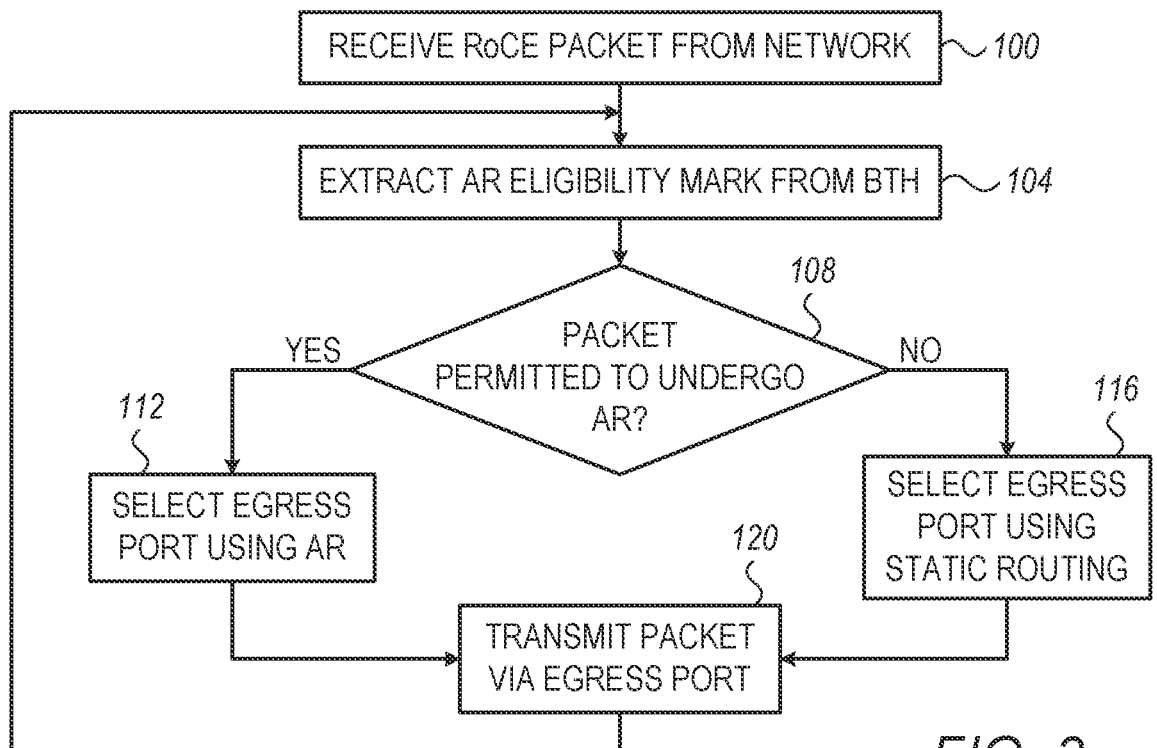
FIG. 3 is a flow chart that schematically illustrates a method for routing RoCE packets having Adaptive Routing (AR) eligibility marks in an Ethernet switch, in accordance with an embodiment of the present invention.

FIG. 3 is a flow chart that schematically illustrates a method for routing RoCE packets having AR eligibility marks in Ethernet switch 36A, in accordance with an embodiment of the present invention. The method begins with switch 36A receiving from network 32 a RoCE packet that is marked with an AR eligibility mark, at a packet reception stage 100.

At a mark extraction stage 104, fabric 56 of switch 36A extracts the eligibility mark from the packet. At an eligibility checking stage 108, fabric 56 checks whether, according to the extracted eligibility mark, the packet is permitted to undergo AR.

If the packet is permitted to undergo AR, fabric 56 selects an egress port for the packet using AR, at an adaptive routing stage 112. If the packet is not permitted to undergo AR, fabric 56 selects an egress port for the packet using static routing, at a static routing stage 116. At a forwarding stage 120, fabric 56 forwards the RoCE packet to the selected egress port, to be transmitted over the selected route in network 32.

The methods of FIGS. 2 and 3 are example methods that are chosen purely for the sake of conceptual clarity. In alternative embodiments, the disclosed techniques can be carried out using any other suitable method. For example, circuitry 48 of source NIC 24 may use any other suitable criterion for deciding whether a particular RoCE packet, or a particular flow of RoCE packets, is permitted to undergo AR or not.

In some embodiments, host 34 may override source NIC 24 in making AR eligibility decisions for packets. For example, source NIC 24 may find by auto-negotiation that destination NIC 28 is capable of processing RoCE packets that arrive OOO, and thus decide to mark the RoCE packets sent to NIC 28 as eligible for AR. Host 34 may override this decision and instruct NIC 24 to mark the RoCE packets sent to NIC 28 as ineligible for AR. In some embodiments, source NIC 24 may force static routing for specific packets within a flow that is specified as eligible for AR.

Scenarios in which host 34 may override an AR eligibility decision of NIC 24, and/or force static routing for specific packets, may comprise, for example:

Host 34 is aware that destination NIC 28 is capable of processing RoCE packets that arrive OOO, even though the destination NIC does not advertise this capability in auto-negotiation.

Auto-negotiation fails, and host 34 decides to use AR irrespective of the lack of knowledge as to the destination NIC capabilities.

Host 34 is aware that the destination NIC is missing certain hardware (e.g., a legacy NIC having no hardware for special CRC checking). In such a case host 34 may force static routing.

Although the embodiments described herein mainly address routing of RoCE packets over an Ethernet network, the methods and systems described herein can also be used in other applications, such as in native IB.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
a port, to send packets to a network in accordance with a Remote Direct Memory Access over Converged Ethernet (RoCE) protocol; and
one or more circuits, to:
decide whether a packet is permitted to undergo Adaptive Routing (AR) in being routed through the network;
mark the packet with an indication of whether the packet is permitted to undergo AR, including, in response to the packet meeting a defined condition, marking the packet as ineligible to undergo AR regardless of whether the packet is eligible or not; and
send the marked packet to the network via the port.

2. The network adapter according to claim 1, wherein the one or more circuits are to decide whether the packet is permitted to undergo AR by negotiating with a peer network adapter at a destination of the packet, and finding whether the peer network adapter is capable of processing RoCE packets that are received Out-Of-Order (OOO).

3. The network adapter according to claim 1, wherein the one or more circuits are to mark the packet by setting a bit in a transport-layer header of the packet.

4. The network adapter according to claim 3, wherein the bit is a reserved bit in a ROCE Base Transport Header (BTH) of the packet.

5. A network adapter, comprising:
a port, to send packets to a network in accordance with a Remote Direct Memory Access over Converged Ethernet (RoCE) protocol; and
one or more circuits, to:
decide whether a packet is permitted to undergo Adaptive Routing (AR) in being routed through the network;
mark the packet with an indication of whether the packet is permitted to undergo AR, including, in response to receiving an override instruction from a host, marking the packet as ineligible to undergo AR even though the peer network adapter is capable of processing ROCE packets received OOO; and
send the marked packet to the network via the port.

6. A network device, comprising:
multiple ports, to send and receive packets to and from a network in accordance with a Remote Direct Memory Access over Converged Ethernet (ROCE) protocol; and
one or more packet processing circuits, to receive a packet, to extract from the packet an indication of whether the packet is permitted to undergo Adaptive Routing (AR), and to route the packet using AR or using static routing, depending on the indication,
wherein:
the network device is a layer-2 switch;
the packet is a RoCE packet comprising a layer-4 packet encapsulated within a layer-2 packet; and
the one or more packet processing circuits of the layer-2 switch are to extract the indication by reading a bit in a layer-4 header of the layer-4 packet that is encapsulated within the layer-2 packet.

7. The network device according to claim 6, wherein the bit is a reserved bit in a ROCE Base Transport Header (BTH) of the packet.

8. A method for communicating Remote Direct Memory Access over Converged Ethernet (ROCE) packets, the method comprising:
in a network adapter, deciding whether a RoCE packet is permitted to undergo Adaptive Routing (AR) in being routed through a network;
marking the ROCE packet in the network adapter with an indication of whether the packet is permitted to undergo AR, including, in response to the packet meeting a defined condition, marking the packet as ineligible to undergo AR regardless of whether the packet is eligible or not; and
sending the marked packet from the network adapter to the network.

9. The method according to claim 8, wherein deciding whether the packet is permitted to undergo AR comprises negotiating with a peer network adapter at a destination of the packet, and finding whether the peer network adapter is capable of processing ROCE packets that are received Out-Of-Order (OOO).

10. The method according to claim 8, wherein marking the packet comprises setting a bit in a transport-layer header of the packet.

11. The method according to claim 10, wherein the bit is a reserved bit in a ROCE Base Transport Header (BTH) of the packet.

12. A method for communicating Remote Direct Memory Access over Converged Ethernet (ROCE) packets, the method comprising:
in a network adapter, deciding whether a ROCE packet is permitted to undergo Adaptive Routing (AR) in being routed through a network;
marking the ROCE packet in the network adapter with an indication of whether the packet is permitted to undergo AR, including, in response to receiving an override instruction from a host, marking the packet as ineligible to undergo AR even though the peer network adapter is capable of processing ROCE packets received OOO; and sending the marked packet from the network adapter to the network.

13. A method for routing Remote Direct Memory Access over Converged Ethernet (ROCE) packets, the method comprising:

in a layer-2 switch, receiving a RoCE packet from a network, the ROCE packet comprising a layer-4 packet encapsulated within a layer-2 packet;

extracting from the ROCE packet an indication of whether the packet is permitted to undergo Adaptive Routing (AR), by reading a bit in a layer-4 header of the layer-4 packet that is encapsulated within the layer-2 packet; and routing the ROCE packet using AR or using static routing, depending on the indication.

14. The method according to claim 13, wherein the bit is a reserved bit in a ROCE Base Transport Header (BTH) of the ROCE packet.

* * * * *